United States Patent
Mohanty et al.

(10) Patent No.: US 12,327,256 B2
(45) Date of Patent: Jun. 10, 2025

(54) TECHNICAL SUPPORT SERVICE LOCATION RECOMMENDATION USING MACHINE LEARNING

(71) Applicant: Dell Products L.P., Round Rock, TX (US)

(72) Inventors: Bijan Kumar Mohanty, Austin, TX (US); Kulin Shaival Chokshi, Round Rock, TX (US); Shijin Babu, Round Rock, TX (US); David J. Linsey, Marietta, GA (US)

(73) Assignee: Dell Products L.P., Round Rock, TX (US)

( * ) Notice: Subject to any disclaimer, the term of this patent is extended or adjusted under 35 U.S.C. 154(b) by 191 days.

(21) Appl. No.: 17/946,223

(22) Filed: Sep. 16, 2022

(65) Prior Publication Data

US 2024/0095750 A1    Mar. 21, 2024

(51) Int. Cl.
  *G06Q 30/00*  (2023.01)
  *G06Q 10/20*  (2023.01)
  *G06Q 30/016* (2023.01)

(52) U.S. Cl.
  CPC .......... *G06Q 30/016* (2013.01); *G06Q 10/20* (2013.01)

(58) Field of Classification Search
  None
  See application file for complete search history.

(56) References Cited

U.S. PATENT DOCUMENTS

| | | | |
|---|---|---|---|
| 9,955,314 B1* | 4/2018 | Bacarella | H04W 4/029 |
| 10,698,749 B1* | 6/2020 | Prakash | G06F 11/0793 |
| 10,810,642 B1* | 10/2020 | Hawilo | G06Q 30/0619 |
| 11,507,820 B1* | 11/2022 | Varrichio | G06N 3/08 |
| 11,615,061 B1* | 3/2023 | Malik | G06F 16/214 |
| | | | 707/602 |
| 11,909,814 B1* | 2/2024 | Truelove | H04L 67/1012 |
| 2007/0273696 A1* | 11/2007 | Cheng | G06V 10/426 |
| | | | 345/467 |
| 2012/0239598 A1* | 9/2012 | Cascaval | G06N 20/00 |
| | | | 706/12 |
| 2015/0269150 A1* | 9/2015 | Carper | G06Q 30/0261 |
| | | | 707/724 |

(Continued)

OTHER PUBLICATIONS

Mcewan, Alistair, et al. "On-Line Device Replacement Techniques for SSD RAID." 2015 EuroMicro Conference on Digital System Design, IEEE Explore, 2015. (Year: 2015).*

(Continued)

*Primary Examiner* — Luis A Brown
(74) *Attorney, Agent, or Firm* — Ryan, Mason & Lewis, LLP

(57) ABSTRACT

A method comprises receiving work order data, wherein the work order data identifies at least one technical support issue requiring resolution. The work order data is analyzed using one or more machine learning algorithms. The method further comprises predicting, based at least in part on the analyzing, whether the at least one technical support issue will be resolved at one or more respective service locations of a plurality of service locations. Based at least in part on the predicting, a recommendation to respond to the at least one technical support issue at a given service location of the plurality of service locations is generated.

20 Claims, 16 Drawing Sheets

(56) References Cited

U.S. PATENT DOCUMENTS

| | | | |
|---|---|---|---|
| 2015/0348051 A1* | 12/2015 | Bodda | G06Q 30/016 705/304 |
| 2018/0018553 A1* | 1/2018 | Bach | G06F 40/279 |
| 2018/0114139 A1* | 4/2018 | Kucera | G06Q 30/0254 |
| 2019/0019197 A1* | 1/2019 | Roberts | G06Q 10/067 |
| 2019/0147457 A1* | 5/2019 | Magowan | G06Q 30/018 705/317 |
| 2019/0213446 A1* | 7/2019 | Tsou | H04W 4/38 |
| 2021/0064616 A1* | 3/2021 | Hu | G06N 20/00 |
| 2021/0110293 A1* | 4/2021 | Lehr | G06N 5/01 |
| 2021/0311838 A1* | 10/2021 | Hughes | G06F 11/3495 |
| 2021/0358008 A1* | 11/2021 | Tessler | G06Q 30/0206 |
| 2021/0406832 A1* | 12/2021 | Tennur Narayanan | G06F 11/302 |
| 2022/0083950 A1* | 3/2022 | Agarwal | G06Q 10/063116 |
| 2022/0092481 A1* | 3/2022 | Neithalath | G06N 20/20 |
| 2022/0245707 A1* | 8/2022 | Bathe | G06N 20/20 |
| 2022/0414299 A1* | 12/2022 | Benzvi | G06N 20/20 |
| 2023/0053204 A1* | 2/2023 | As | G06N 20/20 |
| 2023/0197204 A1* | 6/2023 | Montserrat | G06N 20/20 702/20 |
| 2023/0401538 A1* | 12/2023 | Saha | G06Q 10/1095 |

OTHER PUBLICATIONS

Wu, Suzhen, et al. "Proactive Data Migration for Improved Storage Availability in Large-Scale Data Centers." IEEE Transactions on Computers, vol. 64, No. 9, Sep. 2015. (Year: 2015).*

J. Shubham, "Ensemble Learning—Bagging and Boosting," https://becominghuman.ai/ensemble-learning-bagging-and-boosting-d20f38be9b1e, Jul. 3, 2018, 8 pages.

J. Rocca, "Ensemble Methods: Bagging, Boosting and Stacking," https://towardsdatascience.com/ensemble-methods-bagging-boosting-and-stacking-c9214a10a205, Apr. 22, 2019, 28 pages.

U.S. Appl. No. 17/861,553 filed in the name of Bijan Kumar Mohanty et al. on Jul. 11, 2022, and entitled "Resource Prediction for Microservices.".

* cited by examiner

| Work Order Number | Customer | Customer Type | Product Model | Operating System | Issue Type | Region | Warranty | Support Location | Target |
|---|---|---|---|---|---|---|---|---|---|
| 20220115 | Acme Inc. | Business | Latitude 7420 | Windows 10 Pro | Hard Drive | AMERICAS | ProSupport Plus | On-Site | Yes |
| 20220117 | John Doe | Consumer | Inspiron 5593 | Windows 11 Home | Fan Assembly | APJ | ProSupport | On-Site | Yes |
| 20220203 | Jane Smith | Consumer | Precision 5560 | Windows 10 Pro | Hard Drive | EMEA | BASIC | Depot | No |
| 20220115 | John Smith | Consumer | Inspiron 7300 | Windows 10 Pro | Keyboard Assembly | EMEA | BASIC | Depot | No |
| 20220214 | XYZ Inc. | Business | Precision 5550 | Ubuntu 20.04 | Solid State Drive | AMERICAS | ProSupport | Depot | No |
| 20220205 | ABC Inc. | Business | Latitude 5420 | Ubuntu 22.04 | Fan Assembly | AMERICAS | ProSupport Plus | On-Site | Yes |

```
%matplotlib inline
import pandas as pd
import numpy as np
import matplotlib.pyplot as plt
import seaborn as sns
from sklearn.model_selection import train_test_split
```

```
# reading the historical data file into pandas dataframe
resolution_df = pd.read_csv("resolution_workorder_dispatch.csv") # read the historical resolution workorder dispatch data
```

601

FIG. 6B resolution_df.head(10)

| | workorder | customer | customer_type | product_model | operating_system | issue_type | region | warranty | support_location | resolution_outcome |
|---|---|---|---|---|---|---|---|---|---|---|
| 0 | 20220413 | Acme Inc. | Business | Latitude 7420 | Windows 10 Pro | Hard Drive | AMERICAS | ProSupportPlus | On-Site | Yes |
| 1 | 20220417 | John Doe | Consumer | Inspiron 5000 | Windows 11 | Fan Assembly | APJ | ProSupport | On-Site | No |
| 2 | 20220229 | Jane Smith | Consumer | Precision 3500 | Windows 10 Pro | Hard Drive | EMEA | BASIC | Depot | Yes |
| 3 | 20220315 | John Smith | Consumer | Inspiron 7000 | Windows 10 Pro | Keyboard Assembly | EMEA | BASIC | Depot | Yes |
| 4 | 20220414 | XYZ Inc. | Business | Precision 5500 | Ubuntu 20.04 | Solid State Drive | AMERICAS | ProSupport | Depot | Yes |
| 5 | 20220338 | ABC Inc. | Business | Latitude 5420 | Ubuntu 22.04 | Fan Assembly | AMERICAS | ProSupportPlus | On-Site | No |
| 6 | 20220415 | Acme Inc. | Business | Latitude 5420 | Windows 10 Pro | Fan Assembly | AMERICAS | ProSupportPlus | On-Site | No |
| 7 | 20220121 | Don Lee | Consumer | Latitude 5420 | Windows 10 Pro | Fan Assembly | APJ | ProSupport | Depot | Yes |

```
# workorder number and customer doesn't play any role in the target variable.
resolution_df = resolution_df.drop("workorder", axis=1)
resolution_df = resolution_df.drop("customer", axis=1)
```

```
# Encode the categorical values by using Label Encoding
from sklearn.preprocessing import LabelEncoder resolution_df['customer_type'] = LabelEncoder().fit_transform(resolution_df['customer_type'])
resolution_df['product_model'] = LabelEncoder().fit_transform(resolution_df['product_model'])
resolution_df['operating_system'] = LabelEncoder().fit_transform(resolution_df['operating_system'])
resolution_df['issue_type'] = LabelEncoder().fit_transform(resolution_df['issue_type'])
resolution_df['region'] = LabelEncoder().fit_transform(resolution_df['region'])
resolution_df['warranty'] = LabelEncoder().fit_transform(resolution_df['warranty'])
resolution_df['support_location'] = LabelEncoder().fit_transform(resolution_df['support_location'])
resolution_df['resolution_outcome'] = LabelEncoder().fit_transform(resolution_df['resolution_outcome'])

resolution_df.head(10)
```

| customer_type | product_model | operating_system | issue_type | region | warranty | support_location | resolution_outcome |
|---|---|---|---|---|---|---|---|
| 0 | 0 | 3 | 2 | 1 | 0 | 2 | 1 | 1 |
| 1 | 1 | 0 | 3 | 0 | 0 | 1 | 1 | 0 |

```
# Split train and test data sets
#first get the independent variables and dependent variable separated
features = [col for col in resolution_df.columns if col != 'resolution_outcome']

X_train, X_test, y_train, y_test = train_test_split(resolution_df[features], resolution_df['resolution_outcome'],
                                                    test_size=.3, random_state=42)
```

FIG. 8

```
#Gradient Boosting Classifier
from sklearn.ensemble import GradientBoostingClassifier model = GradientBoostingClassifier()

train model
model.fit(X_train, y_train)
score = model.score(X_test, y_test)

print('Accuracy of GradientBoosting Classifier :',score * 100, '%')
```

Accuracy of GradientBoosting Classifier : 100.0 %

FIG. 9

```
# predict for an on-site support of Latitude 7420 Fan Assembly issue for a customer
row = [1, 3, 2, 0, 2, 1, 1]
yhat = model.predict([row])
print(yhat)
[0]

# predict for an depot support of Latitude 7420 Fan Assembly issue for the same customer
row = [1, 3, 2, 0, 2, 1, 0]
yhat = model.predict([row])
print(yhat)
[1]
```

```
#Random Forest Classifier
from sklearn.ensemble import RandomForestClassifier
model = RandomForestClassifier(max_depth = 10, n_estimators=100, random_state = 42)
# Train the model
model.fit(X_train, y_train)
score = model.score(X_test, y_test)

print('Accuracy of RandomForest Classifier :',score * 100, '%')

Accuracy of RandomForest Classifier : 100.0 %
```

```
# predict for an on-site support of Latitude 7420 Fan Assembly issue for a customer
row = [1, 1, 3, 2, 0, 2, 1, 1]
yhat = model.predict([row])
print(yhat)
[0]

# predict for an Depot support of Latitude 7420 Fan Assembly issue for the same customer
row = [1, 1, 3, 2, 0, 2, 1, 0]
yhat = model.predict([row])
print(yhat)
[1]
```

```
# Support Vector Classifier
from sklearn.svm import SVC model = SVC()

Train the model
model.fit(X_train, y_train)
score = model.score(X_test, y_test)

print('Accuracy of SVR Classifier :',score * 100, '%')

Accuracy of SVR Classifier : 33.33333333333333 %
```

FIG. 13

```
# Predict for an on-site support of Latitude 7420 from Assembly issue for a customer
row = [ 1, 3, 2, 0, 2, 1, 1]
yhat = model.predict([row])
print(yhat)
[1]

# Predict for an Depot support of Latitude 7420 from Assembly issue for the same customer
row = [ 1, 3, 2, 0, 2, 1, 0]
yhat = model.predict([row])
print(yhat)
[1]
```

FIG. 14

```
access model
from sklearn.neighbors import KNeighborsClassifier
model = KNeighborsClassifier()

# train the model
model.fit(X_train, y_train)
score = model.score(X_test, y_test)

print('Accuracy of KNN Classifier :',score * 100, '%')

Accuracy of KNN Classifier : 33.33333333333333 %
```

FIG. 15

```
# predict for an on-site support of Latitude 7420 for Assembly issue for a customer
row = [1, 3, 2, 0, 2, 1, 1]
yhat = model.predict([row])
print(yhat)
[1]

# predict for an export support of Latitude 7420 for Assembly issue for the same customer
row = [1, 3, 2, 0, 2, 1, 0]
yhat = model.predict([row])
print(yhat)
[1]
```

FIG. 16

TECHNICAL SUPPORT SERVICE LOCATION RECOMMENDATION USING MACHINE LEARNING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to technical support analysis in information processing systems.

BACKGROUND

Enterprises offer various types of support with their products including, for example, warranties, technical support services and product installation, deployment and repair services. Large enterprises may have numerous support options, which can be combined in multiple ways with, for example, hardware and software products.

As electronic products become more sophisticated, it is increasingly more difficult to determine and execute effective support and repair options for the products. For example, different products, configurations and symptoms challenge enterprises to efficiently respond to hardware and software issues and maximize compute and personnel resources.

SUMMARY

Embodiments provide a service location recommendation platform in an information processing system.

For example, in one embodiment, a method comprises receiving work order data, wherein the work order data identifies at least one technical support issue requiring resolution. The work order data is analyzed using one or more machine learning algorithms. The method further comprises predicting, based at least in part on the analyzing, whether the at least one technical support issue will be resolved at one or more respective service locations of a plurality of service locations. Based at least in part on the predicting, a recommendation to respond to the at least one technical support issue at a given service location of the plurality of service locations is generated.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 2 depicts sample technical support training data and corresponding features in an illustrative embodiment.

FIG. 5 depicts example pseudocode for importation of libraries in an illustrative embodiment.

FIG. 6A depicts example pseudocode for reading historical resolution data into a data frame in an illustrative embodiment.

FIG. 6B depicts example training data in an illustrative embodiment.

FIG. 7A depicts example pseudocode for excluding data that is used for determining a target variable in an illustrative embodiment.

FIG. 7B depicts example pseudocode for encoding training data in an illustrative embodiment.

FIG. 7C depicts encoded training data in an illustrative embodiment.

FIG. 8 depicts example pseudocode for splitting a dataset into training and testing components and for creating separate datasets for independent and dependent variables in an illustrative embodiment.

FIG. 9 depicts example pseudocode for building, training and computing accuracy of a gradient boosting classifier in an illustrative embodiment.

FIG. 10 depicts example pseudocode for using a gradient boosting machine learning model to predict support location in an illustrative embodiment.

FIG. 11 depicts example pseudocode for building, training and computing accuracy of a random forest classifier in an illustrative embodiment.

FIG. 12 depicts example pseudocode for using a random forest machine learning model to predict support location in an illustrative embodiment.

FIG. 13 depicts example pseudocode for building, training and computing accuracy of a support vector machine (SVM) classifier in an illustrative embodiment.

FIG. 14 depicts example pseudocode for using an SVM machine learning model to predict support location in an illustrative embodiment.

FIG. 15 depicts example pseudocode for building, training and computing accuracy of a k-nearest neighbor (KNN) classifier in an illustrative embodiment.

FIG. 16 depicts example pseudocode for using a KNN machine learning model to predict support location in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Figure 1:
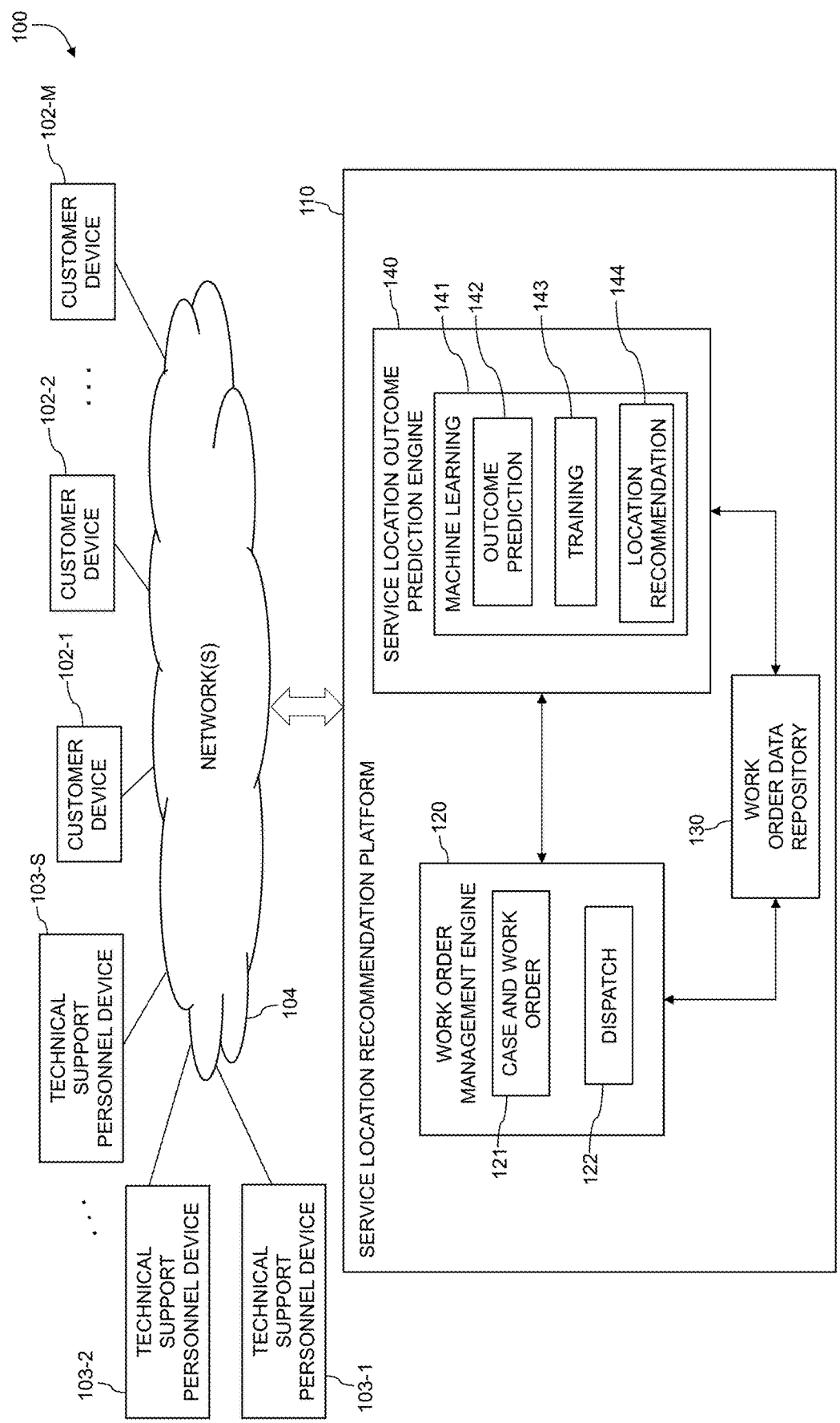
FIG. 1 depicts an information processing system with a service location recommendation platform in an illustrative embodiment.

FIG. 1 shows an information processing system 100 configured in accordance with an illustrative embodiment. The information processing system 100 comprises customer devices 102-1, 102-2, . . . 102-M (collectively "customer devices 102") and technical support personnel devices 103-1, 103-2, . . . 103-S (collectively "technical support personnel devices 103"). The customer devices 102 and technical support personnel devices 103 communicate over a network 104 with a service location recommendation platform 110. The variable M and other similar index variables herein such as K, L and S are assumed to be arbitrary positive integers greater than or equal to one.

The customer devices 102 and technical support personnel devices 103 can comprise, for example, Internet of Things (IoT) devices, desktop, laptop or tablet computers, mobile telephones, or other types of processing devices capable of communicating with the service location recommendation platform 110 over the network 104. Such devices are examples of what are more generally referred to herein as "processing devices." Some of these processing devices are also generally referred to herein as "computers." The customer devices 102 and technical support personnel devices 103 may also or alternately comprise virtualized computing resources, such as virtual machines (VMs), containers, etc. The customer devices 102 and/or technical support personnel devices 103 in some embodiments comprise respective computers associated with a particular company, organization or other enterprise.

The terms "customer," "administrator," "personnel" or "user" herein are intended to be broadly construed so as to encompass numerous arrangements of human, hardware, software or firmware entities, as well as combinations of such entities. Service location recommendation services may be provided for users utilizing one or more machine learning models, although it is to be appreciated that other types of infrastructure arrangements could be used. At least a portion of the available services and functionalities provided by the service location recommendation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the service location recommendation platform 110, as well as to support communication between the service location recommendation platform 110 and connected devices (e.g., customer devices 102 and technical support personnel devices 103) and/or other related systems and devices not explicitly shown.

In some embodiments, the technical support personnel devices 103 are assumed to be associated with repair technicians, system administrators, information technology (IT) managers, software developers, release management personnel or other authorized personnel configured to access and utilize the service location recommendation platform 110.

The customer devices 102 are respectively associated with one or more customers experiencing issues (e.g., hardware and/or software failures, malfunctions or other issues) with one or more products. As explained in more detail herein, along with a given product (e.g., personal computer, laptop, storage array, appliance, etc.), an enterprise may offer support options such as, but not necessarily limited to, warranties and installation, deployment and repair services for the given product. If products experience problems, consumers typically seek reliable support offerings to return their product to working order with minimal time and effort. However, providing support for high technology products is extremely complex due to the availability of various parts from different suppliers, both hardware and software issues, and the need for troubleshooting to diagnose and solve problems.

In some instances, decisions must be made whether technical support services are provided to a customer on-site (e.g., at a location where the device is used by the customer) or off-site (e.g., at a service location designated for providing technical support and repair services). In the case of on-site support, a field technician may be dispatched along with any necessary parts to a customer location to repair a product. On-site repair may ultimately be more efficient and convenient for a customer than off-site support, which requires a customer to ship or deliver a device to a repair facility and wait for the repaired product to be returned. However, with the on-site model, if a technician is unable to resolve an issue due to, for example, a wrong diagnosis, insufficient parts or other issues, additional trips may be needed. As a result, although off-site repairs may require more time for products to be fixed, the convenience and time-saving benefits of on-site service can diminish if a resolution requires multiple trips by the technician.

The embodiments advantageously provide techniques for using machine learning to intelligently and automatically identify which service location (e.g., on-site or off-site) will result in a desired outcome of repair of a product using minimal time and resources. In illustrative embodiments, one or more machine learning models are trained with historical, multi-dimensional technical support work order data identifying for example, technical support issues, the corresponding location where service was performed, and the outcome (e.g., whether the technical support issue was resolved). Unlike conventional approaches where there is no system in place to automatically analyze incoming technical support requests and determine an effective service location, the machine learning algorithms of the embodiments learn the types of issues that can be successfully resolved on-site, and the issues that are better suited for off-site services (e.g., issues that are likely unable to be resolved in one service visit). The embodiments automatically recommend (e.g., predict) a service location and, based on the recommended service location, automatically execute a dispatch process in, for example, a customer relationship management (CRM) system, to execute the repair at the recommended service location.

The service location recommendation platform 110 in the present embodiment is assumed to be accessible to the customer devices 102 and/or technical support personnel devices 103 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the service location recommendation platform 110 includes a work order management engine 120, a work order data repository 130 and a service location outcome prediction engine 140. The work order management engine 120 includes a case and work order receiving layer 121 and a dispatch layer 122. The service location outcome prediction engine 140 includes a machine learning layer 141 comprising an outcome prediction layer 142, a training layer 143 and a location recommendation layer 144.

The case and work order receiving layer 121 of the work order management engine 120 collects and compiles work order data from the customer devices 102 and/or technical support personnel devices 103. The work order data can include, for example, current work order data for an existing issue that needs to be resolved and historical work order data for issues that have previously been addressed, and may or may not have been resolved. Using the historical work order data, the service location recommendation platform 110 generates and adds data to the work order data repository 130. In illustrative embodiments, the historical work order data is used by the training layer 143 of the service location outcome prediction engine 140 to train one or more machine learning algorithms to predict whether certain product issues will be resolved at a given location (e.g., on-site or off-site) and to recommend a service location based on the prediction. The service location recommendation platform 110 generates the work order data repository 130 by harvesting case and/or incident work orders and dispatch data from the work order management engine 120. In illustrative embodiments, the work order management engine 120 is part of a CRM system and/or other systems in an enterprise.

The current and historical work order data comprises, for example, information including, but not necessarily limited to, customer identifiers, product identifiers (e.g., model numbers) of products requiring support, software details (e.g., versions, operating systems), type of issue (e.g., type of hardware and/or software failure), service location (on-site or off-site), warranty information, resolution outcome of a previous dispatch, etc. Although such details corresponding to, for example, historical work order data, are maintained in the work order data repository 130, in one or more illustrative embodiments, the work order management engine 120, and more particularly, the case and work order receiving layer 121, manages important attributes of the work order data by filtering out unnecessary or less pertinent information for the outcome prediction performed by outcome prediction layer 142 of the machine learning layer 141. For example, the case and work order receiving layer 121 performs data engineering and data pre-processing to isolate features and data elements (e.g., product identifiers, software details, type of issue, service location (also referred to herein as "support location") and resolution outcome) that are more likely to influence the predictions for resolution outcome at a given service location. Features such as, for example, customer and warranty, which are less likely to influence the predictions for resolution outcome at a given service location, may be deemphasized and/or given less weight than the other features. This data engineering and data pre-processing includes generating multivariate plots and correlation heatmaps to identify the significance of each feature in a dataset so that less important data elements to the prediction are given less weight and/or are filtered. The data engineering and data pre-processing reduces the dimensions and complexity of machine learning models, hence improving model accuracy and performance, and allowing for more efficient use of compute resources.

FIG. 2 depicts a table 200 of sample historical work order data that may be used to train the one or more machine learning models used for outcome prediction by the service location outcome prediction engine 140. According to illustrative embodiments, the training data is stored in the work order data repository 130. It is to be understood that the data illustrated in table 200 is illustrative, and the embodiments are not necessarily limited to what is shown in FIG. 2. Work order data with more or less features may be used in other embodiments. As can be seen in the table 200, the training data identifies work orders with a work order number, customers with a customer name and customer type (e.g., business or individual consumer), and products with a product model and an operating system. The training data further specifies the type of issue (e.g., hard drive, fan assembly, keyboard, solid state drive (SSD), etc.). The type of issue is not necessarily limited to hardware, and may include software or other issues. The training data also identifies a region where the service was performed, a warranty, service location (e.g., on-site or off-site (also referred to herein as "Depot") and whether the issue was resolved. Training data indicating whether particular issues have been resolved at respective service locations is used by the machine learning models to predict whether the same or similar issues will be resolved if the services are performed at the same or different locations.

The outcome prediction layer 142 of the service location outcome prediction engine 140 predicts, with a high degree of accuracy, whether an issue will be resolved at a given service location and, based on the prediction, the location recommendation layer 144 recommends a service location at which to attempt resolution of the issue. Given the complexity and dimensionality of the work order data in an enterprise, illustrative embodiments utilize a shallow learning approach leveraging decision tree-based, ensemble bagging and boosting algorithms. Additionally, one or more embodiments also utilize a support vector machine (SVM) algorithm to increase accuracy and efficiency in training.

The service location outcome prediction engine 140, and more particularly, the training layer 143 uses a supervised learning approach for training with features that include, for example, support (service) location (e.g., on-site or off-site) previous resolution outcomes for particular types of issues. In illustrative embodiments, the resolution outcome (whether the issue will be resolved) is the target variable to be predicted. When a new case is received at the work order management engine 120 from, for example, technical support personnel via a technical support personnel device 103 or directly from a customer via a customer device 102, details of the case are input to a trained model of the machine learning layer 141 of the service location outcome prediction engine 140. For example, referring to the operational flow 400 in FIG. 4, new work order data 125 including, for example, customer identifiers, product identifiers (e.g., model numbers) of products requiring support, software details (e.g., versions, operating systems), type of issue (e.g., type of hardware and/or software failure), service location (on-site or off-site) and warranty information are input to the service location outcome prediction engine 140. For example, a customer may contact technical support personnel with a particular device issue, and the details of the device issue along with the additional features noted above are provided to the service location outcome prediction engine 140 along with a specified service location so that the outcome prediction layer of the machine learning (ML) layer 141 can predict whether the issue will be resolved at the specified service location (issue resolved 150-1) or not resolved (issue not resolved 150-2) at the specified service location. In some embodiments, the outcome prediction layer 142 predicts whether an issue will be resolved at multiple service locations (e.g., on-site and off-site).

If the outcome prediction layer 142 predicts that an issue will be resolved successfully on-site, the location recommendation layer 144 recommends that service be performed on-site (e.g., at the customer location) and the dispatch layer 122 of the work order management engine 120 generates an order to respond to the issue at the on-site location. If the outcome prediction layer 142 predicts that an issue will not be resolved successfully on-site, the location recommendation layer 144 recommends that service be performed off-site (e.g., at a designated service facility) and the dispatch layer 122 of the work order management engine 120 generates an order to respond to the issue at the off-site location. In illustrative embodiments, the dispatch layer 122 automatically generates notifications to the technical support personnel (via, for example, technical support personnel devices 103) and/or customers (via, for example, customer devices 102) indicating the location recommendation. Also, in some embodiments, the dispatch layer 122 automatically generates support tickets and work orders indicating processes to be performed by designated members of a support team to use when attempting to resolve the issue. The dispatch layer 122 also automatically orders parts that may be needed for resolving the issue, where the parts are sent to the on-site or off-site service location. In some instances, the dispatch layer 122 automatically downloads or provides notifications to download software or firmware to devices in need of repair, where such software or firmware may be needed during the repair process. The dispatch layer 122 may also automatically execute data migrations to replacement devices or cloud storage in the case of off-site support operations requiring a replacement device.

Figure 4:
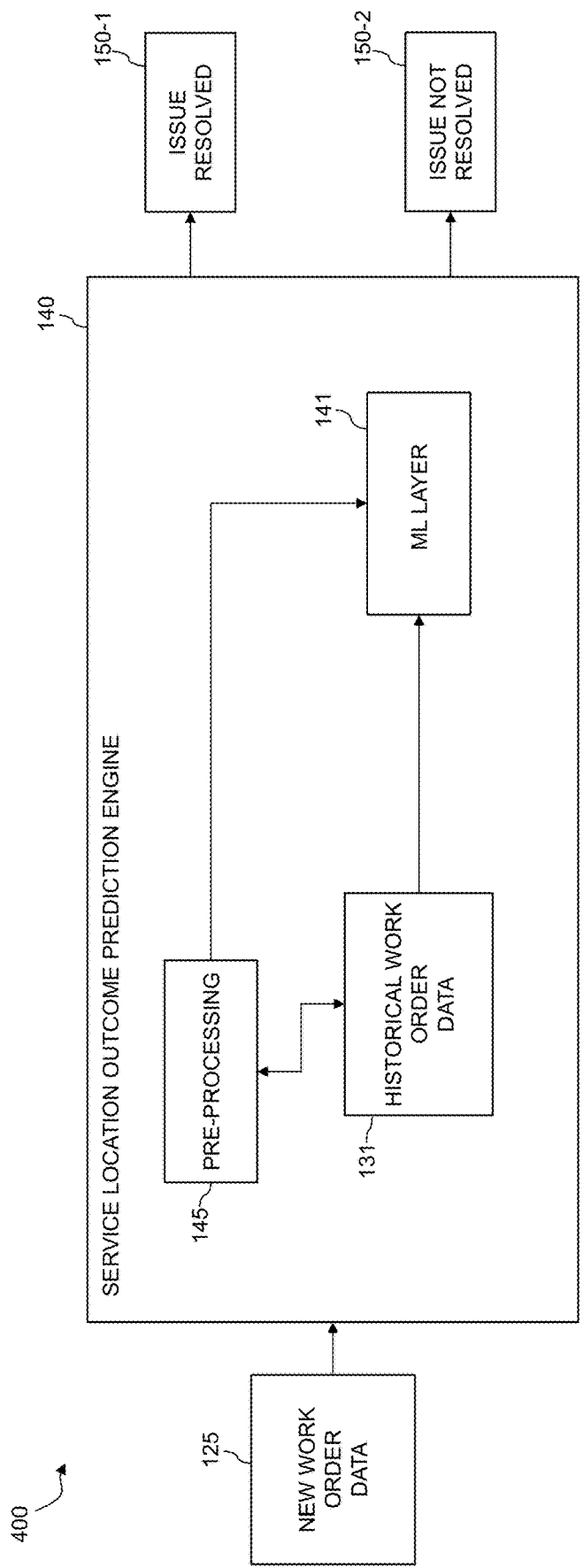
FIG. 4 depicts an operational flow for service location outcome prediction in an illustrative embodiment.

Referring to FIG. 4, the service location outcome prediction engine 140 includes the machine learning (ML) layer 141, which leverages decision tree-based, ensemble bagging and boosting algorithms and is trained with historical work order data 131 from the work order data repository 130 to accurately predict issue resolution outcome at a service location. In FIG. 4, the service location outcome prediction engine 140 illustrates a pre-processing component 145, which processes the incoming new work order data 125 and the historical work order data 131 for analysis by the ML layer 141. For example, the pre-processing component 145 removes any unwanted characters, punctuation, and stop words. In addition, in illustrative embodiments, the pre-processing component 145 performs data engineering and data pre-processing as described above to identify the significance of each feature in a dataset so that less important data elements to the prediction are given less weight and/or are filtered. Additionally, as described in more detail herein below, the pre-processing component 145 prepares and encodes the data for analysis by the machine learning algorithms.

As shallow learning options, the embodiments utilize an ensemble bagging technique with a random forest algorithm and an ensemble boosting technique with a gradient boosting algorithm as binary classification approaches for predicting the resolution outcome class. The random forest algorithm is used for prediction and recommendation because of its efficiency and accuracy of processing large volumes of data. The random forest algorithm uses bagging (bootstrap aggregating) to generate predictions; this includes using multiple classifiers (e.g., in parallel) each trained on different data samples and different features. This reduces the variance and the bias that results from using a single classifier. Final classification is achieved by aggregating the predictions that were made by the different classifiers.

Figure 3:
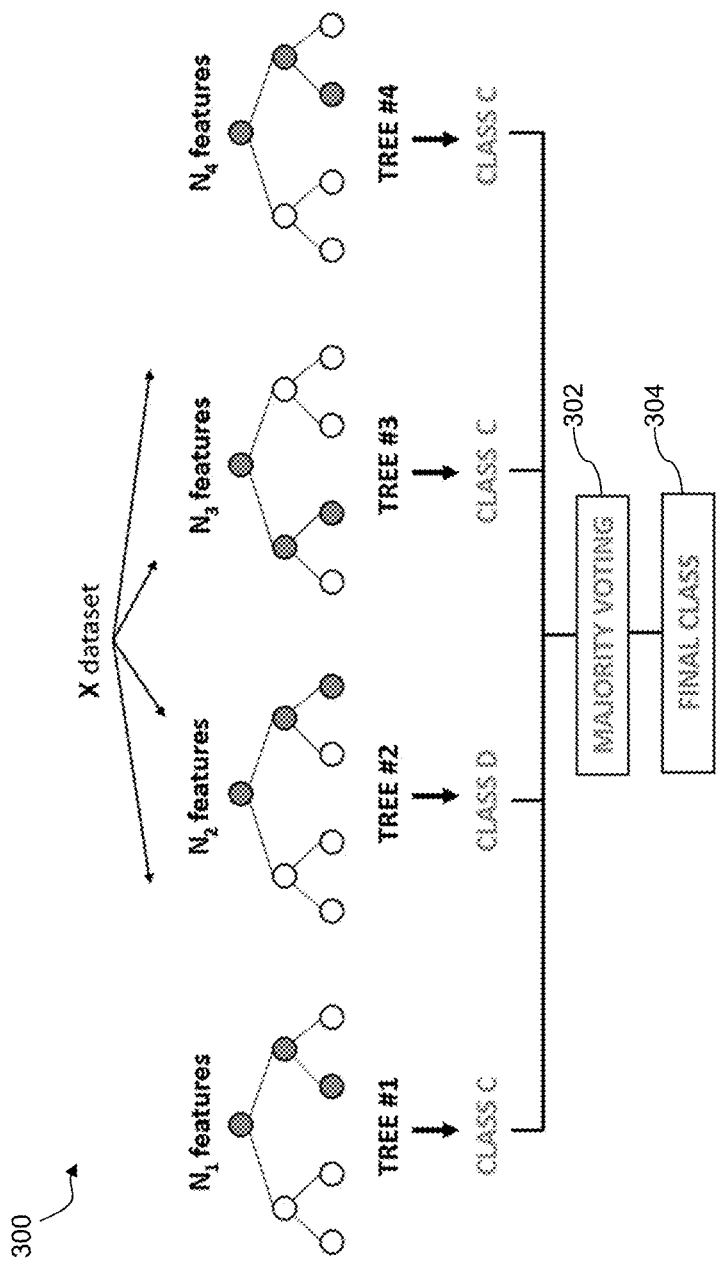
FIG. 3 depicts a plurality of decision trees used in connection with a random forest classifier according to an illustrative embodiment.

Referring to the random forest classifier diagram 300 in FIG. 3, the ML layer 141 constructs a plurality of decision trees (Tree #1, Tree #2, Tree #3 and Tree #4) using different features and different data samples, which reduces bias and variance as noted above. In the training process, the decision trees Tree #1, Tree #2, Tree #3 and Tree #4 are constructed using the training data, which comprises historical work order data. Using the outcome prediction layer 142, in the testing process, data ("X dataset" in FIG. 3) comprising, for example, customer identifiers, product identifiers (e.g., model numbers) of products requiring support, software details (e.g., versions, operating systems), type of issue (e.g., type of hardware and/or software failure), service location (on-site or off-site) and warranty information, is inputted to the multiple decision trees (Tree #1, Tree #2, Tree #3 and Tree #4) to generate a prediction whether an issue will be resolved at a particular service location. Based on the inputted data, each decision tree (Tree #1, Tree #2, Tree #3 and Tree #4) yields a score indicative of whether the issue will be resolved at a particular service location. In illustrative embodiments, a random forest classifier uses binary classification, meaning that the results of a classification would be one of a two types of classes (e.g., whether the issue will be resolved at the service location). In some embodiments, further details correspond to the prediction, such as, for example, whether the issue will be resolved in one attempt or visit at the service location. Each class (e.g., Class C and class D in FIG. 3) represents one outcome (e.g., YES or NO), and the model predicts each class with the confidence score. In illustrative embodiments, a confidence score above 50% is considered to be enough to constitute a valid prediction. The Final Class 304 is determined based on whether the majority of decision trees indicate that the issue will be or will not be resolved. For example, in the random forest classifier diagram 300 of FIG. 3, the majority of decision trees provide a confidence score (e.g., over a certain threshold) which indicate that the issue will be resolved, such that through Majority Voting 302, the Final Class 304 for this particular set of circumstances (X dataset) is that the issue will be resolved at a given location. Random forest classification is based on the wisdom of a plurality of models. Instead of using just one model (e.g., decision tree) to make a prediction, a random forest technique uses multiple uncorrelated decision trees, which outperforms the methodology when using single tree. The use of multiple decision trees minimizes errors, when compared with using a single decision tree. In this model, even if some trees might yield an incorrect result, the majority of decision trees will produce a correct result. Although four decision trees are shown, the embodiments are not necessarily limited to four decision trees, and more or less decision trees may be used.

According to the embodiments, the random forest algorithm can be used for classification tasks, and can handle multiple features such as, for example, binary, categorical and numerical features. In addition, the random forest model eliminates the need to rescale or transform data, and works well with high dimensional data. Advantageously, the random forest model allows for higher training speed and quicker prediction generation than previous methods. The random forest techniques used herein are also robust to outliers and non-linear data, and handle unbalanced data well.

In connection with the operation of the service location outcome prediction engine 140, FIG. 5 depicts example pseudocode 500 for importation of libraries used to implement the service location outcome prediction engine 140. For example, Python, ScikitLearn, Pandas and Numpy libraries can be used. Some embodiments may implement multi-class classification using a random forest algorithm to predict a service location for optimized issue resolution.

FIG. 6A depicts example pseudocode 601 for reading historical work order data into a Pandas data frame for building training data. A historical work order data file including, for example, case, work order and dispatch details with the outcome (issue resolved or not), is generated as a CSV file and the data is read to a Pandas data frame before displaying columns as in FIG. 6B. Similar to FIG. 2, FIG. 6B depicts a table 602 of example training data in an illustrative embodiment. As can be seen in the table 602, the training data identifies a work order, customer name and type, product model and operating system, issue type, region, warranty, support (service) location and resolution outcome. The data shown in the table 602 is a non-limiting example of the attributes of training data, and the embodiments are not necessarily limited to the depicted attributes.

FIG. 7A depicts example pseudocode 701 for excluding data that is used for determining a target variable. In a non-limiting example, work order number and customer name may not play a large role in influencing the target variable (resolution outcome). As a result, these features are dropped from the training data before training is performed. FIG. 7B depicts example pseudocode 702 for encoding training data. Referring back to the pre-processing component 145 in FIG. 4, since machine learning works with numbers, categorical and textual attributes like customer type, product model and operating system, issue type, region, warranty, support (service) location and resolution outcome, etc. must be encoded before being used as training data. In one or more embodiments, this can be achieved by leveraging a LabelEncoder function of ScikitLearn library as shown in the pseudocode 702 in FIG. 7B. FIG. 7C depicts a table 703 of the encoded training data, where categorical and textual attributes are converted into numerical values.

According to illustrative embodiments, the encoded training dataset is split into training and testing datasets, separate datasets are created for independent variables and dependent variables. Some embodiments use a train test split function of an sklearn library to split the data into training and testing sets. The training set is used for training the machine learning model(s) while the test set is used for testing/validating and computing accuracy score(s) of the model(s). In some embodiments, a training set will contain 70% of the observations, while a testing set will contain 30% of the observations. The function also separates the dependent variables (X) and the independent/target variable (y). FIG. 8 depicts example pseudocode 800 for splitting a dataset into training and testing components and for creating separate datasets for independent (y) and dependent (X) variables.

FIG. 9 depicts example pseudocode 900 for building, training and computing accuracy of a gradient boosting classifier. In some embodiments, a gradient boosting algorithm is used to predict resolution outcome at a given service location. The gradient boosting algorithm is an ensemble decision tree-based boosting algorithm, which is related to the random forest algorithm. Like the random forest algorithm, the gradient boosting algorithm uses multiple decision tree classifiers and then uses a mode value (or other averaging mechanism (e.g., mean, median, etc.) of the outputs of the decision tree classifiers as the prediction. Unlike random forest techniques, which use parallel execution of multiple decision trees, gradient boosting techniques use sequential execution of multiple decision trees. In FIG. 9, the accuracy of the gradient boosting classifier is 100%.

FIG. 10 depicts example pseudocode 1000 for using a gradient boosting machine learning model to predict support (service) location. For example, the gradient boosting machine learning model is used to predict resolution outcome when service is provided on-site for a particular product model and issue type. Following a prediction that the issue will not be resolved or not be resolved in less than a threshold number of attempts, the gradient boosting machine learning model is used to predict resolution outcome when the service is provided off-site for the particular product model and issue type. In the case of a prediction that the issue will be resolved with off-site support, the location recommendation layer 144 recommends the off-site service location and the dispatch layer 122 creates the appropriate work orders and dispatches to carry out the off-site service.

FIG. 11 depicts example pseudocode 1100 for building, training and computing accuracy of a random forest classifier. In some embodiments, as noted above, a random forest algorithm is used to predict resolution outcome at a given service location. The random forest algorithm is an ensemble decision tree-based bagging algorithm, which uses multiple decision tree classifiers and then majority voting of the outputs of the decision tree classifiers as the prediction. In FIG. 11, the accuracy of the random forest classifier is 100%.

FIG. 12 depicts example pseudocode for using a random forest machine learning model to predict support location in an illustrative embodiment. Similar to the gradient boosting machine learning model, the random forest machine learning model is used to predict resolution outcome when service is provided on-site for a particular product model and issue type. Following a prediction that the issue will not be resolved or not be resolved in less than a threshold number of attempts, the random forest machine learning model is used to predict resolution outcome when the service is provided off-site for the particular product model and issue type. As can be understood from FIGS. 10 and 12, either or both of the gradient boosting and random forest algorithms can be used to predict resolution outcome.

FIG. 13 depicts example pseudocode 1300 for building, training and computing accuracy of an SVM classifier. The accuracy of the SVM classifier is depicted as about 33%. FIG. 14 depicts example pseudocode 1400 for using an SVM machine learning model to predict support location in an illustrative embodiment. FIG. 15 depicts example pseudocode 1500 for building, training and computing accuracy of a KNN classifier. The accuracy of the SVM classifier is depicted as about 33%. FIG. 16 depicts example pseudocode 1600 for using a KNN machine learning model to predict support location.

According to one or more embodiments, the work order data repository 130 and other data corpuses, repositories or databases referred to herein can be configured according to a relational database management system (RDBMS) (e.g., PostgreSQL). In some embodiments, the work order data repository 130 and other data corpuses, repositories or databases referred to herein are implemented using one or more storage systems or devices associated with the service location recommendation platform 110. In some embodiments, one or more of the storage systems utilized to implement the work order data repository 130 and other data corpuses, repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the service location recommendation platform 110, the work order management engine 120, the work order data repository 130 and/or the service location outcome prediction engine 140 in other embodiments can be implemented at least in part externally to the service location recommendation platform 110, for example, as stand-alone servers, sets of servers or other types of systems coupled to the network 104. For example, the work order management engine 120, the work order data repository 130 and/or the service location outcome prediction engine 140 may be provided as cloud services accessible by the service location recommendation platform 110.

The work order management engine 120, the work order data repository 130 and/or the service location outcome prediction engine 140 in the FIG. 1 embodiment are each assumed to be implemented using at least one processing device. Each such processing device generally comprises at least one processor and an associated memory, and implements one or more functional modules for controlling certain features of the work order management engine 120, the work order data repository 130 and/or the service location outcome prediction engine 140.

At least portions of the service location recommendation platform 110 and the elements thereof may be implemented at least in part in the form of software that is stored in memory and executed by a processor. The service location recommendation platform 110 and the elements thereof comprise further hardware and software required for running the service location recommendation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the work order management engine 120, the work order data repository 130, the service location outcome prediction engine 140 and other elements of the service location recommendation platform 110 in the present embodiment are shown as part of the service location recommendation platform 110, at least a portion of the work order management engine 120, the work order data repository 130, the service location outcome prediction engine 140 and other elements of the service location recommendation platform 110 in other embodiments may be implemented on one or more other processing platforms that are accessible to the service location recommendation platform 110 over one or more networks. Such elements can each be implemented at least in part within another system element or at least in part utilizing one or more stand-alone elements coupled to the network 104.

It is assumed that the service location recommendation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or LXCs, or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the work order management engine 120, the work order data repository 130, the service location outcome prediction engine 140 and other elements of the service location recommendation platform 110, and the elements thereof can each be implemented in the form of one or more LXCs running on one or more VMs. Other arrangements of one or more processing devices of a processing platform can be used to implement the work order management engine 120, the work order data repository 130, the service location outcome prediction engine 140, as well as other elements of the service location recommendation platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the service location recommendation platform 110 to reside in different data centers. Numerous other distributed implementations of the service location recommendation platform 110 are possible.

Accordingly, one or each of the work order management engine 120, the work order data repository 130, the service location outcome prediction engine 140 and other elements of the service location recommendation platform 110 can each be implemented in a distributed manner so as to comprise a plurality of distributed elements implemented on respective ones of a plurality of compute nodes of the service location recommendation platform 110.

It is to be appreciated that these and other features of illustrative embodiments are presented by way of example only, and should not be construed as limiting in any way. Accordingly, different numbers, types and arrangements of system elements such as the work order management engine 120, the work order data repository 130, the service location outcome prediction engine 140 and other elements of the service location recommendation platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the service location recommendation platform can be offered to cloud infrastructure customers or other users as part of FaaS, CaaS and/or PaaS offerings.

Figure 17:
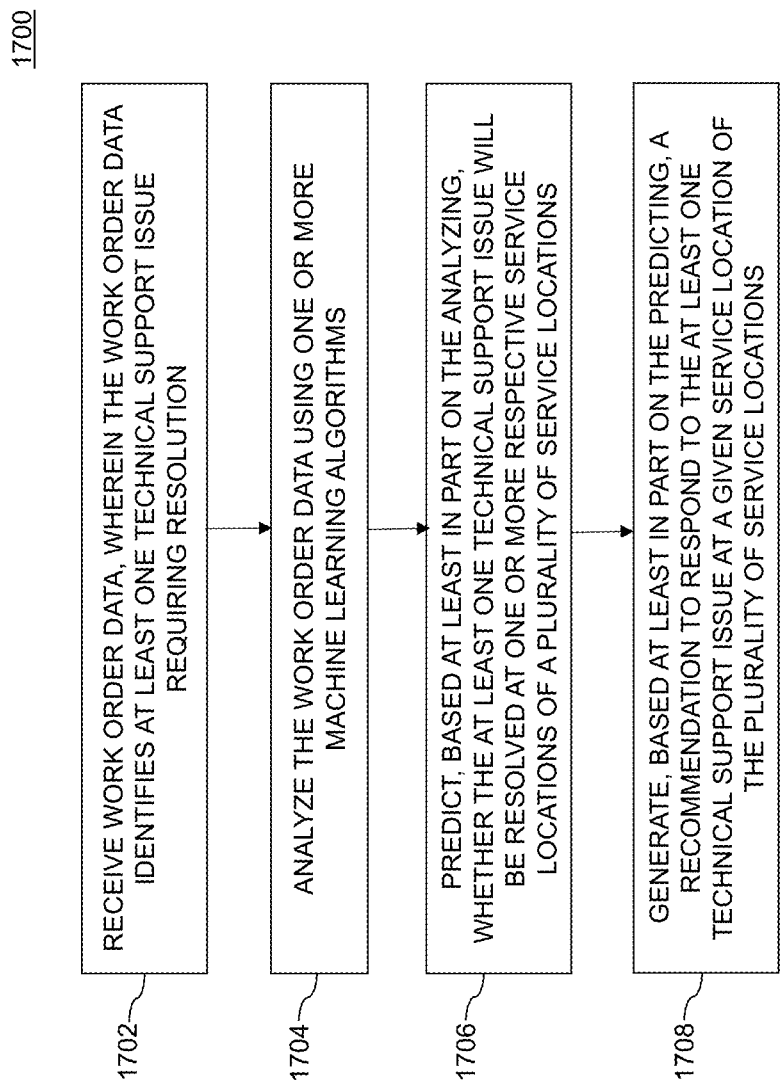
FIG. 17 depicts a process for service location recommendation according to an illustrative embodiment.

The operation of the information processing system 100 will now be described in further detail with reference to the flow diagram of FIG. 17. With reference to FIG. 17, a process 1700 for service location recommendation as shown includes steps 1702 through 1708, and is suitable for use in the system 100 but is more generally applicable to other types of information processing systems comprising a service location recommendation platform configured for predicting issue resolution at particular service locations and recommending a service location based on the prediction.

In step 1702, work order data identifying at least one technical support issue requiring resolution is received. In step 1704, the work order data is analyzed using one or more machine learning algorithms. In an embodiment, the one or more machine learning algorithms comprise an ensemble decision tree-based boosting algorithm such as, for example, a gradient boosting algorithm. In another embodiment, the one or more machine learning algorithms comprise an ensemble decision tree-based bagging algorithm such as, for example, a random forest algorithm. The one or more machine learning algorithms may comprise a shallow learning algorithm.

In step 1706, based at least in part on the analyzing, a prediction is made whether the at least one technical support issue will be resolved at one or more respective service locations of a plurality of service locations. The plurality of service locations comprise an on-site service location and an off-site service location.

In step 1708, based at least in part on the predicting, a recommendation to respond to the at least one technical support issue at a given service location of the plurality of service locations is generated. The given service location corresponds to a prediction that the at least one technical support issue will be resolved at the given service location.

The one or more machine learning algorithms are trained with a dataset comprising historical work order data. The historical work order data specifies a plurality of technical support issues and whether the plurality of technical support issues were resolved at respective ones of the plurality of service locations.

The one or more machine learning algorithms comprise a plurality of decision trees, and the plurality of decision trees are respectively trained with different portions of the historical work order data. In illustrative embodiments, each of the plurality of decision trees yields one of a positive result and a negative result with respect to whether the at least one technical support issue will be resolved at the one or more respective service locations of the plurality of service locations. The prediction whether the at least one technical support issue will be resolved at the one or more respective service locations of the plurality of service locations corresponds to the result produced by a majority of the plurality of decision trees. The historical work order data is harvested from a CRM system.

It is to be appreciated that the FIG. 17 process and other features and functionality described above can be adapted for use with other types of information systems configured to execute service location recommendation services in a service location recommendation platform or other type of platform.

The particular processing operations and other system functionality described in conjunction with the flow diagram of FIG. 17 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 17 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a service location recommendation platform as disclosed herein can provide a number of significant advantages relative to conventional arrangements. For example, the service location recommendation platform uses machine learning to proactively predict issue resolution outcome of complex high technology device support operations at different support locations. The embodiments advantageously leverage sophisticated machine learning classification techniques that are trained using multi-dimensional, historical support information. As an additional advantage, a CRM system can utilize the prediction of an optimized service location to automatically dispatch support operations that can be resolved expeditiously, thereby reducing unnecessary utilization of compute and other organizational resources.

Conventional approaches are not equipped to account for the difficulties associated with formulating technical support operations for increasingly sophisticated electronic products with multiple software and hardware configurations. Certain problems with computer products may be difficult to reproduce (e.g., latency, lockups, crashes, etc.) and may have a variety of underlying root causes from different and unexpected sources. For example, a failure to power on could be related to a power supply, power cable, part of a motherboard or short circuits elsewhere within a product. Additionally, some repair operations may require data migration to a replacement product.

Unlike conventional approaches, illustrative embodiments provide technical solutions which formulate programmatically and with a high degree of accuracy the capability to intelligently and proactively predict whether issues can be resolved successfully at a customer location without needing multiple visits or whether repair at a service facility is more appropriate. In more detail, the embodiments improve technical support operations by leveraging machine learning models trained with historical support data to predict issue resolution outcome at particular service locations. By utilizing the historical support information that includes multi-dimensional features like customer, product, issue type, region, support location and resolution outcome, the embodiments provide techniques to train ensemble decision tree-based bagging and boosting algorithms to predict the most optimized location for technical support.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors.

Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the service location recommendation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a service location recommendation platform in illustrative embodiments. These and other cloud-based systems in illustrative embodiments can include object stores.

Illustrative embodiments of processing platforms will now be described in greater detail with reference to FIGS. 18 and 19. Although described in the context of system 100, these platforms may also be used to implement at least portions of other information processing systems in other embodiments.

Figure 18:
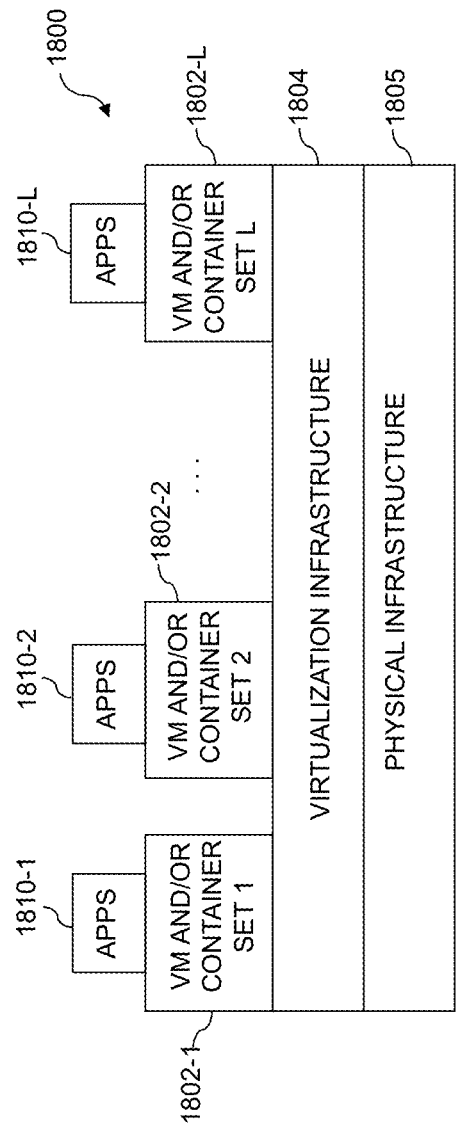
FIGS. 18 and 19 show examples of processing platforms that may be utilized to implement at least a portion of an information processing system according to illustrative embodiments.
Figure 19:
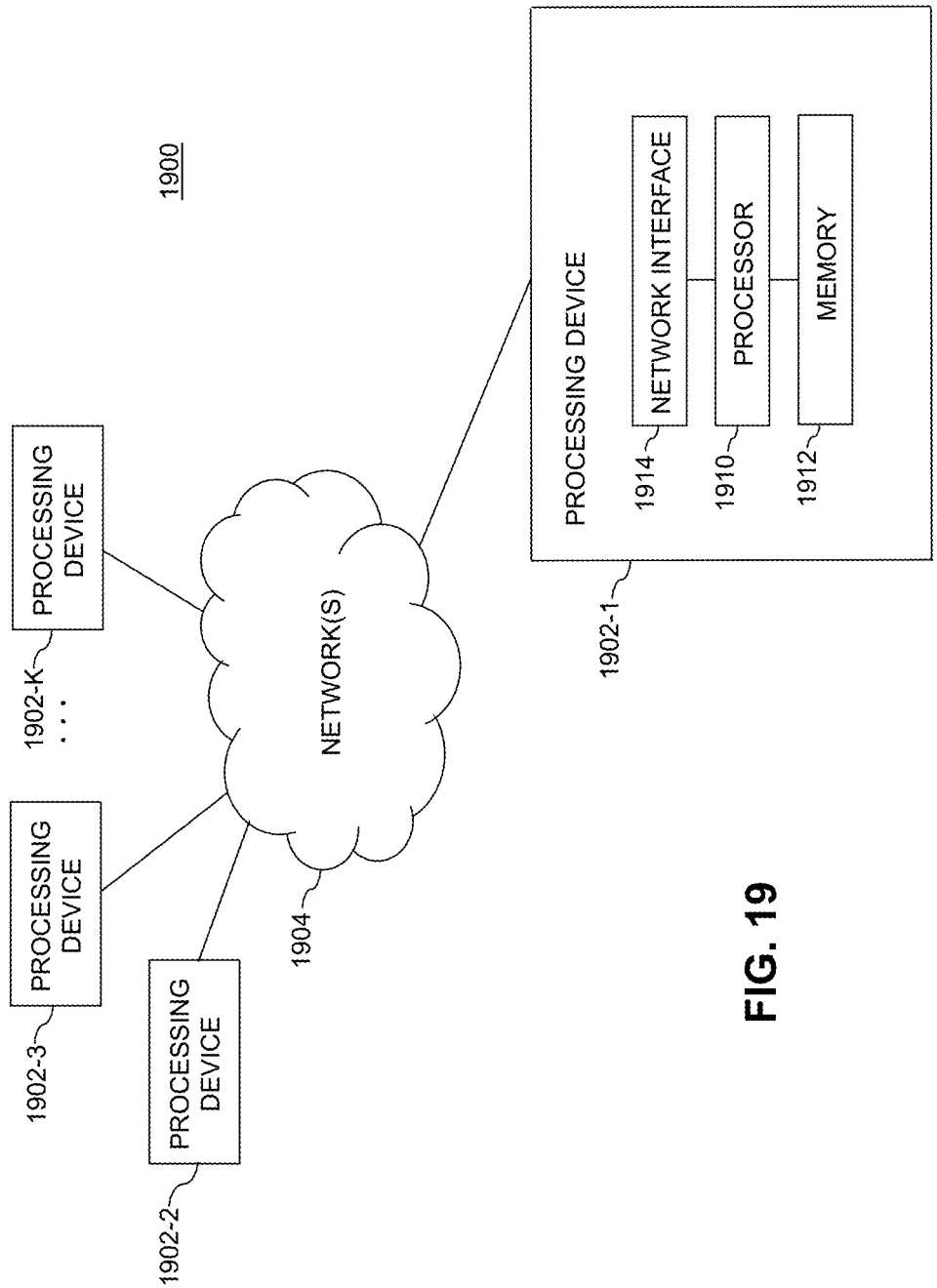

FIG. 18 shows an example processing platform comprising cloud infrastructure 1800. The cloud infrastructure 1800 comprises a combination of physical and virtual processing resources that may be utilized to implement at least a portion of the information processing system 100. The cloud infrastructure 1800 comprises multiple virtual machines (VMs) and/or container sets 1802-1, 1802-2, . . . 1802-L implemented using virtualization infrastructure 1804. The virtualization infrastructure 1804 runs on physical infrastructure 1805, and illustratively comprises one or more hypervisors and/or operating system level virtualization infrastructure. The operating system level virtualization infrastructure illustratively comprises kernel control groups of a Linux operating system or other type of operating system.

The cloud infrastructure 1800 further comprises sets of applications 1810-1, 1810-2, . . . 1810-L running on respective ones of the VMs/container sets 1802-1, 1802-2, . . . 1802-L under the control of the virtualization infrastructure 1804. The VMs/container sets 1802 may comprise respective VMs, respective sets of one or more containers, or respective sets of one or more containers running in VMs.

In some implementations of the FIG. 18 embodiment, the VMs/container sets 1802 comprise respective VMs implemented using virtualization infrastructure 1804 that comprises at least one hypervisor. A hypervisor platform may be used to implement a hypervisor within the virtualization infrastructure 1804, where the hypervisor platform has an associated virtual infrastructure management system. The underlying physical machines may comprise one or more distributed processing platforms that include one or more storage systems.

In other implementations of the FIG. 18 embodiment, the VMs/container sets 1802 comprise respective containers implemented using virtualization infrastructure 1804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1800 shown in FIG. 18 may represent at least a portion of one processing platform. Another example of such a processing platform is processing platform 1900 shown in FIG. 19.

The processing platform 1900 in this embodiment comprises a portion of system 100 and includes a plurality of processing devices, denoted 1902-1, 1902-2, 1902-3, . . . 1902-K, which communicate with one another over a network 1904.

The network 1904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1902-1 in the processing platform 1900 comprises a processor 1910 coupled to a memory 1912. The processor 1910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1912 may comprise random access memory (RAM), read-only memory (ROM), flash memory or other types of memory, in any combination. The memory 1912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1902-1 is network interface circuitry 1914, which is used to interface the processing device with the network 1904 and other system components, and may comprise conventional transceivers.

The other processing devices 1902 of the processing platform 1900 are assumed to be configured in a manner similar to that shown for processing device 1902-1 in the figure.

Again, the particular processing platform 1900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the service location recommendation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and service location recommendation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

receiving work order data in a work order management engine of a processing platform comprising at least one processing device operatively coupled to a memory, wherein the work order data identifies at least one technical support issue requiring resolution, and is received in the work order management engine from a user device over a network, the processing platform further comprising a customer relationship management (CRM) system;

maintaining, via the CRM system of the processing platform, at least one set of historical work order data;

analyzing, in a machine learning system implemented in the processing platform by the at least one processing device operatively coupled to the memory, the work order data using one or more machine learning algorithms;

predicting, by at least one of the one or more machine learning algorithms in the machine learning system and based at least in part on the analyzing, whether the at least one technical support issue will be resolved at one or more respective service locations of a plurality of service locations, the at least one of the one or more machine learning algorithms comprising a plurality of distinct tree-based classifiers, arranged in parallel with one another, each processing respective distinct sets of features derived from the work order data to generate a corresponding separate prediction as to whether the at least one technical support issue will be resolved at the one or more respective service locations of the plurality of service locations, each of the distinct tree-based classifiers yielding one of a positive result and a negative result with respect to whether the at least one technical support issue will be resolved at the one or more respective service locations of the plurality of service locations, wherein different ones of the distinct tree-based classifiers are trained using respective different portions of the set of historical work order data maintained by the CRM system, the different portions of the set of historical work order data corresponding to the respective distinct sets of features;

generating, in the processing platform and based at least in part on the predicting by the at least one of the one or more machine learning algorithms, a recommendation to respond to the at least one technical support issue at a given service location of the plurality of service locations;

generating, in the processing platform, an order to respond to the at least one technical support issue at the given service location;

automatically executing a dispatch process in the CRM system of the processing platform to execute a repair at the given service location in accordance with the generated order, wherein in conjunction with executing the dispatch process the CRM system automatically performs one or more dispatch support operations relating to the given service location; and automatically executing one or more data migrations from a device corresponding to the at least one technical support issue to at least one of a replacement device and a designated storage location in response to generating the order;

wherein the steps of the method are executed by the at least one processing device operatively coupled to the memory.

2. The method of claim 1 wherein the given service location corresponds to a prediction that the at least one technical support issue will be resolved at the given service location.

3. The method of claim 1 further comprising training the one or more machine learning algorithms with a dataset comprising historical work order data.

4. The method of claim 3 wherein the historical work order data specifies a plurality of technical support issues and whether the plurality of technical support issues were resolved at respective ones of the plurality of service locations.

5. The method of claim 3 wherein the one or more machine learning algorithms comprise a plurality of decision trees, and the plurality of decision trees are respectively trained with different portions of the historical work order data.

6. The method of claim 5 wherein:

each of the plurality of decision trees yields one of a positive result and a negative result with respect to whether the at least one technical support issue will be resolved at the one or more respective service locations of the plurality of service locations; and the prediction whether the at least one technical support issue will be resolved at the one or more respective service locations of the plurality of service locations corresponds to the result produced by a majority of the plurality of decision trees.

7. The method of claim 3 further comprising harvesting the historical work order data from the CRM system.

8. The method of claim 1 wherein the plurality of service locations comprise an on-site service location and an off-site service location.

9. The method of claim 1 wherein the one or more machine learning algorithms comprise an ensemble decision tree-based boosting algorithm.

10. The method of claim 9 wherein the one or more machine learning algorithms comprise a gradient boosting algorithm.

11. The method of claim 1 wherein the one or more machine learning algorithms comprise an ensemble decision tree-based bagging algorithm.

12. The method of claim 11 wherein the one or more machine learning algorithms comprise a random forest algorithm.

13. The method of claim 1 wherein the one or more machine learning algorithms comprise a shallow learning algorithm.

14. An apparatus comprising:

a processing platform comprising at least one processing device operatively coupled to a memory, said at least one processing device being configured:

to receive work order data in a work order management engine of the processing platform comprising the at least one processing device operatively coupled to the memory, wherein the work order data identifies at least one technical support issue requiring resolution, and is received in the work order management engine from a user device over a network, the processing platform further comprising a customer relationship management (CRM) system;

to maintain, via the CRM system of the processing platform, at least one set of historical work order data;

to analyze, in a machine learning system implemented in the processing platform by the at least one processing device operatively coupled to the memory, the work order data using one or more machine learning algorithms;

to predict, by at least one of the one or more machine learning algorithms in the machine learning system and based at least in part on the analyzing, whether the at least one technical support issue will be resolved at one or more respective service locations of a plurality of service locations, the at least one of the one or more machine learning algorithms comprising a plurality of distinct tree-based classifiers, arranged in parallel with one another, each processing respective distinct sets of features derived from the work order data to generate a corresponding separate prediction as to whether the at least one technical support issue will be resolved at the one or more respective service locations of the plurality of service locations, each of the distinct tree-based classifiers yielding one of a positive result and a negative result with respect to whether the at least one technical support issue will be resolved at the one or more respective service locations of the plurality of service locations, wherein different ones of the distinct tree-based classifiers are trained using respective different portions of the set of historical work order data maintained by the CRM system, the different portions of the set of historical work order data corresponding to the respective distinct sets of features;

to generate, in the processing platform and based at least in part on the predicting by the at least one of the one or more machine learning algorithms, a recommendation to respond to the at least one technical support issue at a given service location of the plurality of service locations;

to generate, in the processing platform, an order to respond to the at least one technical support issue at the given service location;

to automatically execute a dispatch process in the CRM system of the processing platform to execute a repair at the given service location in accordance with the generated order, wherein in conjunction with executing the dispatch process the CRM system automatically performs one or more dispatch support operations relating to the given service location; and to automatically execute one or more data migrations from a device corresponding to the at least one technical support issue to at least one of a replacement device and a designated storage location in response to generating the order.

15. The apparatus of claim 14 wherein the given service location corresponds to a prediction that the at least one technical support issue will be resolved at the given service location.

16. The apparatus of claim 14 wherein the processing device is further configured to train the one or more machine learning algorithms with a dataset comprising historical work order data.

17. The apparatus of claim 16 wherein the historical work order data specifies a plurality of technical support issues and whether the plurality of technical support issues were resolved at respective ones of the plurality of service locations.

18. An article of manufacture comprising a non-transitory processor-readable storage medium having stored therein program code of one or more software programs, wherein the program code when executed by at least one processing device causes said at least one processing device to perform the steps of:

receiving work order data in a work order management engine of a processing platform comprising the at least one processing device, wherein the work order data identifies at least one technical support issue requiring resolution, and is received in the work order management engine from a user device over a network, the processing platform further comprising a customer relationship management (CRM) system;

maintaining, via the CRM system of the processing platform, at least one set of historical work order data;

analyzing, in a machine learning system implemented in the processing platform by the at least one processing device operatively coupled to a memory, the work order data using one or more machine learning algorithms;

predicting, by at least one of the one or more machine learning algorithms in the machine learning system and based at least in part on the analyzing, whether the at least one technical support issue will be resolved at one or more respective service locations of a plurality of service locations, the at least one of the one or more machine learning algorithms comprising a plurality of distinct tree-based classifiers, arranged in parallel with one another, each processing respective distinct sets of features derived from the work order data to generate a corresponding separate prediction as to whether the at least one technical support issue will be resolved at the one or more respective service locations of the plurality of service locations, each of the distinct tree-based classifiers yielding one of a positive result and a negative result with respect to whether the at least one technical support issue will be resolved at the one or more respective service locations of the plurality of service locations, wherein different ones of the distinct tree-based classifiers are trained using respective different portions of the set of historical work order data maintained by the CRM system, the different portions of the set of historical work order data corresponding to the respective distinct sets of features;

generating, in the processing platform and based at least in part on the predicting by the at least one of the one or more machine learning algorithms, a recommendation to respond to the at least one technical support issue at a given service location of the plurality of service locations;

generating, in the processing platform, an order to respond to the at least one technical support issue at the given service location;

automatically executing a dispatch process in the CRM system of the processing platform to execute a repair at the given service location in accordance with the generated order, wherein in conjunction with executing the dispatch process the CRM system automatically performs one or more dispatch support operations relating to the given service location; and automatically executing one or more data migrations from a device corresponding to the at least one technical support issue to at least one of a replacement device and a designated storage location in response to generating the order.

19. The article of manufacture of claim 18 wherein the given service location corresponds to a prediction that the at least one technical support issue will be resolved at the given service location.

20. The article of manufacture of claim 18 wherein the program code further causes said at least one processing device to perform the step of training the one or more machine learning algorithms with a dataset comprising historical work order data.

* * * * *